United States Patent [19]
Haase

[11] Patent Number: 4,557,530
[45] Date of Patent: Dec. 10, 1985

[54] FLAT, COMPACT, LINEAR BALL BEARING WITH WEDGE-LOCKED ECCENTRIC ADJUSTMENT AND REMOVABLE RACES IN CYLINDRICAL SEATS

[76] Inventor: Harold A. Haase, Taunton Hill Rd., Newtown, Conn.

[21] Appl. No.: 613,900

[22] Filed: May 24, 1984

[51] Int. Cl.[4] .............................................. F16C 29/06
[52] U.S. Cl. ...................................................... 308/6 C
[58] Field of Search ...................... 308/6 R, 6 C, 6 A; 464/168

[56] References Cited

U.S. PATENT DOCUMENTS

| | | | |
|---|---|---|---|
| 3,044,835 | 7/1962 | Hurd | 308/6 C |
| 3,336,090 | 8/1967 | Aller | 308/6 R |
| 4,025,995 | 5/1977 | Thomson | 308/6 C X |
| 4,426,119 | 1/1984 | Mottate | 308/6 C |
| 4,472,003 | 9/1984 | Osawa | 308/6 C |

OTHER PUBLICATIONS

"Linear Ball Bearings . . . ", Precision Motions Co., May, 1984.
Franke & Heydrich: "Ball Return Mechanisms", May, 1984.

*Primary Examiner*—Stuart S. Levy
*Assistant Examiner*—Lynn M. Sohacki
*Attorney, Agent, or Firm*—Parmelee, Bollinger & Bramblett

[57] ABSTRACT

A linear ball bearing housing assembly includes a unitary central body and two plastic end pieces fastened to the body by roll pins. A channel defines a closed loop within the housing assembly for recirculating balls. A longitudinal opening in one side of the housing assembly allows the balls to contact a straight raceway so that the balls can roll easily along this way as the bearing travels back and forth relative to the way. The bearing may be mounted on the machine member which moves relative to the stationary way, or alternatively, the way may be movable relative to the bearing mounted upon a stationary machine member. A bail extends in front of the longitudinal opening to retain the balls when the bearing unit is not positioned against the opposing way. The bail is secured by molded grooved sockets inside of the end pieces. In order to adjust pre-loading between the balls and their races, an eccentric post whose lower portion fits in a hole in the machine member and whose upper portion fits in the housing assembly is adjusted. After this pre-load has been adjusted, a wedge member is tightened against the eccentric, thereby fixing the desired amount of pre-loading. The bearing is then secured in position by tightening machine screws. Removable interchangeable race elements made from wear-resistant material are secured in place be retainer ears formed on the inside of the end pieces.

20 Claims, 9 Drawing Figures

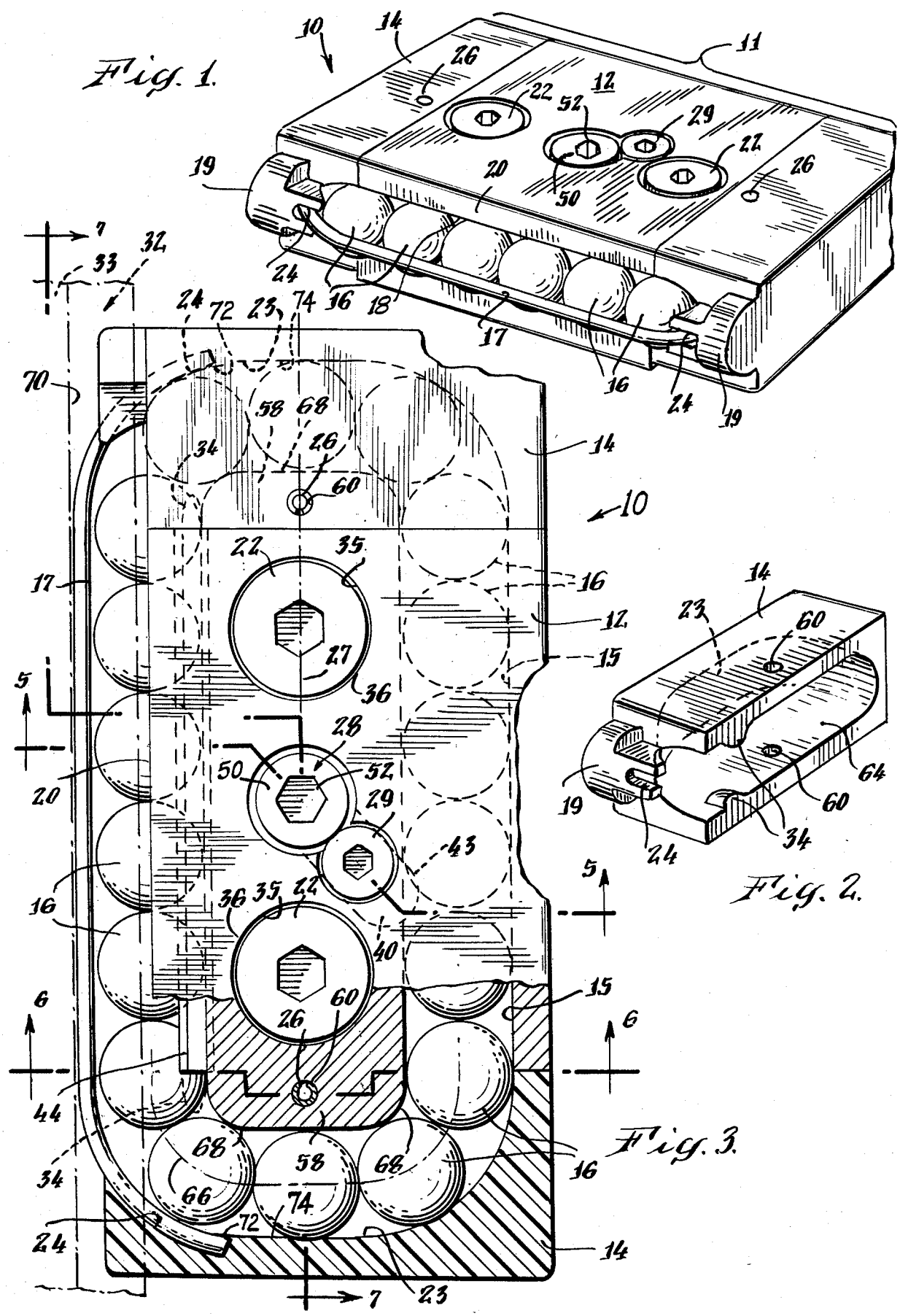

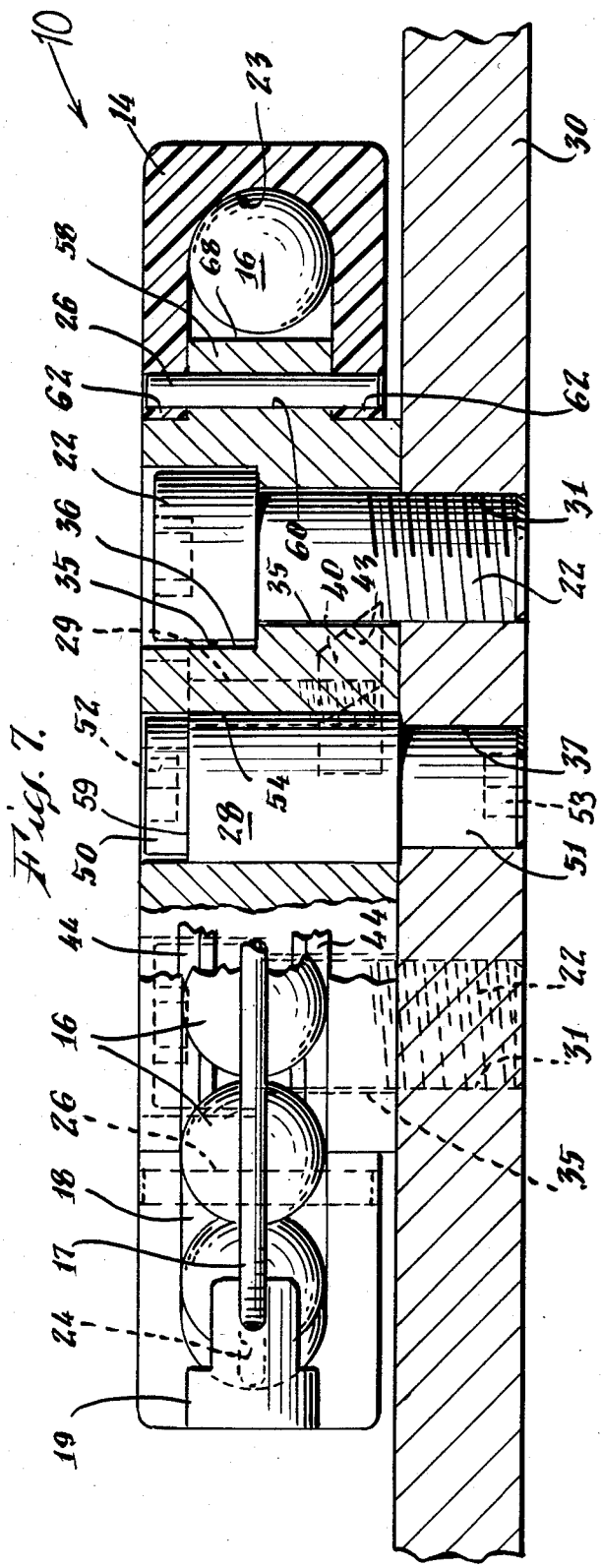
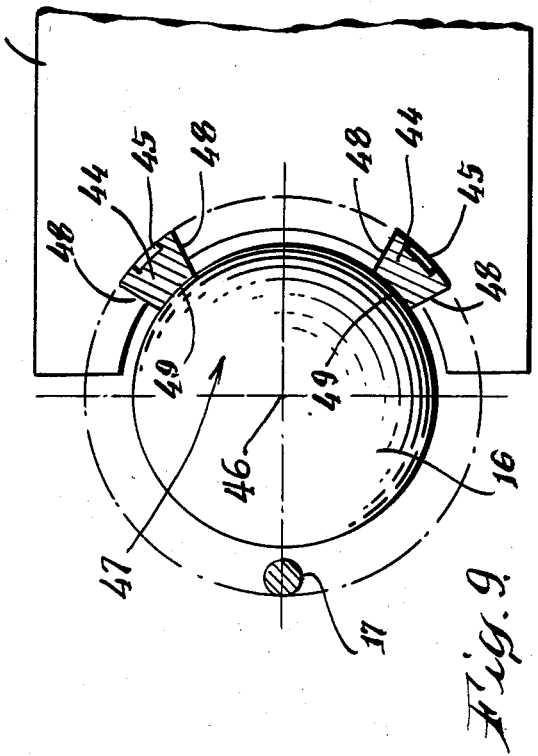
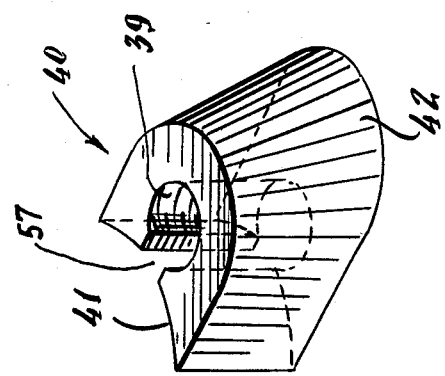

FLAT, COMPACT, LINEAR BALL BEARING WITH WEDGE-LOCKED ECCENTRIC ADJUSTMENT AND REMOVABLE RACES IN CYLINDRICAL SEATS

FIELD OF THE INVENTION

This invention relates to linear ball bearings and more particularly to such linear ball bearings which provide a flat, low, and compact profile combined with high efficiency, accuracy, and high load-bearing capacity and with quiet recirculation of the balls. The bearing assembly employs an eccentric pre-load adjustment for providing a precise, sensitive-feel fit of the balls against their load. The rugged and rebuildable construction of the apparatus utilizes low cost and lightweight components which further include interchangeable elements.

BACKGROUND OF THE INVENTION

Linear ball bearings have long been manufactured from large, unitary pieces of hardened and laboriously milled and grooved tool steel. Such prior art construction requires an expensive, hardened mass of tool steel with a machined groove throughout its interior, which undergoes undesirable dimensional changes during hardening and necessitates costly and detailed grinding to reinstate the critical dimensions of the original design.

Furthermore, the long ball bearing housings typically employed in the past have the disadvantage of requiring a relatively large number of balls involving additional expense and diminished efficiency. Other troublesome aspects of the linear ball bearings often encountered in the prior art include unwieldly, protruding adjustment mechanisms which not only constrict the device's versatility, but also fail to provide an accurate and reliable means of fitting the balls against their load. In addition, these previous high-profile and bulky linear bearings incorporate fixed, permanent race surfaces which may not be repaired or replaced. Such a limitation makes the entire prior art linear bearings useless when the race surfaces become worn or in any way damaged.

Many of the prior art linear ball bearing units are not efficient in their utilization of space. The apparent intent of their manufacturers is to reduce the loading on each ball by causing a relatively large number of balls to share the load by providing long straight races, but the result is a long, bulky unit, with uneven wear. In my opinion such long linear bearing units are wasteful of space and undesirable for reasons to be explained. A careful examination of the lengthy straight race, after the long linear bearing unit has been subjected to considerable usage, has shown me that wear actually is concentrated mainly at each end of the long straight races. In other words, the balls rolling along the middle portion of the long race usually are carrying a smaller share of the load then those rolling along near the ends. This uneven wear is caused by the fact that the opposing way, regardless of how carefully it is machined and mounted, will deflect somewhat, for it is not infinitely rigid. The machinist is seeking an absolutely dead straight way, but there is always some deviation with "hills" and "valleys". Thus, the opposing way will often have one or more concave arcuate regions. The long straight race of such lengthy prior art units travels like a geometric chord spanning across the concave arc of the opposing way, causing loading and sometimes overloading to occur on balls near each end of such a long race. As stated above, their long length is an inefficient use of space and does not result in an appropriate sharing of the load among the balls rolling along the long race.

Furthermore, it is more difficult and expensive and requires more expertise to mount a long linear bearing unit effectively parallel to an opposing way than it is to mount a short unit. The linear ball bearing unit or the opposed way may be mounted in a machine slightly skewed so that they are not exactly in the same plane. One end of the bearing unit may be too high and the other end too low, causing excessive wear and often causing overloading of the balls at the ends of the long race. The longer bearing unit needs more sophisticated shimming mounting than a shorter one. Indicator mounting and skillful expertise is often needed with a longer bearing unit in order to meet the requisite effective parallelism between the opposing way and the long race in the long bearing unit.

In summary, the longer linear bearing unit is wasteful of space, is more difficult and expensive to mount properly, and is less tolerant of any inaccuracies and deflections of the opposing way. The longer unit does not roll over the "hills" and "valleys" of the opposing way as well as a shorter unit and wears unevenly.

Consequently, I have concluded that the maximum length of the straight race should not exceed six times the diameter of the ball bearings. Then, in spite of some deflections in the opposing way, in spite of inaccurracies in machining and mounting, all of the relatively few (six or less) balls will actually share in carrying the load, and the wear will be much more evenly distributed along the length of the short straight race. The shorter unit is more "forgiving" and keeps more balls in active loadbearing use in proportion to the total number of balls in the unit and readily avoids overloading of balls at each end of the race.

SUMMARY OF THE INVENTION

An object of the present invention is to provide an improved flat, and compact linear ball bearing which can be constructed easily from low-cost materials and which features high-efficiency, load-bearing characteristics and versatile design. The metal body of the housing has two injection-molded plastic end pieces fastened to opposite ends of this body by spring-metal roll pins which are easily installed and removed. These roll pins join the inexpensive yet durable pair of plastic end pieces to the single, low-cost central metal body.

These plastic end pieces desirably enable the balls to recirculate much more quietly than in a prior art linear ball bearing unit with an all-metal housing.

A further object of the invention is to provide replaceable, repairable, and interchangeable races which "float" circumferentially in race-element seats concentric with the intended axis of travel of the rolling balls and which therefore need not be precisely fitted within the body of the housing.

By virtue of using a pair of removable, replaceable race elements in the body of the bearing housing this body can be constructed of much less expensive material than tool steel. For example, this body can be cast iron or aluminum. When the body is made of aluminum it can be extruded, cut to length and finished with just a few convenient machining operations. The pair of race elements themselves are formed of hardened material, but they comprise only a small portion of the assembly.

Yet another object of the invention is to provide an eccentric pre-load adjustment mechanism which may readily be adjusted with great precision and concomitantly affords a "soft-touch" or sensitive-feel to the user during the pre-load adjustment. The adjustment mechanism is advantageously rugged and durable since it is self-contained and protected within the housing and does not hinder the operation of the ball bearing by protruding above the low-profile, unitary body. Once the desired level of pre-load compression of the balls against the load is achieved by turning the eccentric post and then holding the setting by tightening a wedge, a pair of machine screws are tightened to secure the bearing housing mounted in place on a machine member.

Another feature of this invention is the eccentric adjustment mechanism which resists jamming and locking due to the steep-angled surface of a wedge member acting on the eccentric post to counteract forces imposed on this post by the pre-load on the balls. Thus, this wedge member advantageously maintains the eccentric adjustment post aligned in an upright position without the need for a precision close-fitting hole in order to prevent it from tilting during the pre-load adjustment for assuring a secure and reliable positioning of the bearing housing. The adjustment post is further conveniently disposed with wrench sockets on either end so that the eccentric may be adjusted by the user from either above or below the mounting surface.

This compact linear ball bearing unit is intended to have a short straight race whose length does not exceed six ball diameters. In the presently preferred illustrative embodiment of the present invention the straight race has a length of approximately five ball diameters, and there are only eighteen balls shown in the whole unit.

BRIEF DESCRIPTION OF THE DRAWINGS

The foregoing and other aspects, objects, features, and advantages of the invention will become more fully understood from the following description of a preferred embodiment of the invention, as illustrated in the accompanying drawings, in which like reference characters refer to the same parts throughout the different views. The drawings are not necessarily to scale, emphasis instead being placed upon illustrating the principles of the invention.

FIG. 1 is a perspective view illustrating the improved linear ball bearing embodying the present invention.

FIG. 2 is a perspective view illustrating one of the two plastic end pieces which fit over the ends of the central body to form the complete housing assembly of this improved linear ball bearing.

FIG. 3 is an enlarged top view showing a partially cut away portion, of the housing assembly of this improved linear ball bearing.

FIG. 5 is a sectional view taken along broken plane 5—5 in FIG. 3 for showing in detail the pre-load adjustment eccentric with its locking means and the removable and replaceable race elements.

FIG. 7 is a front elevational and sectional view taken through broken plane 7—7 in FIG. 3.

FIG. 8 is a perspective view of the wedge member which is employed as part of the locking means for accurately and conveniently adjusting the balls' pre-loading of the linear ball bearing unit.

FIG. 9 shows an enlargement of certain parts in FIG. 5 for explaining the relationship of the balls, race elements and retainer bail. Some sectioning lines are omitted for clarity of explanation.

DESCRIPTION OF A PREFERRED EMBODIMENT

Figure 4:
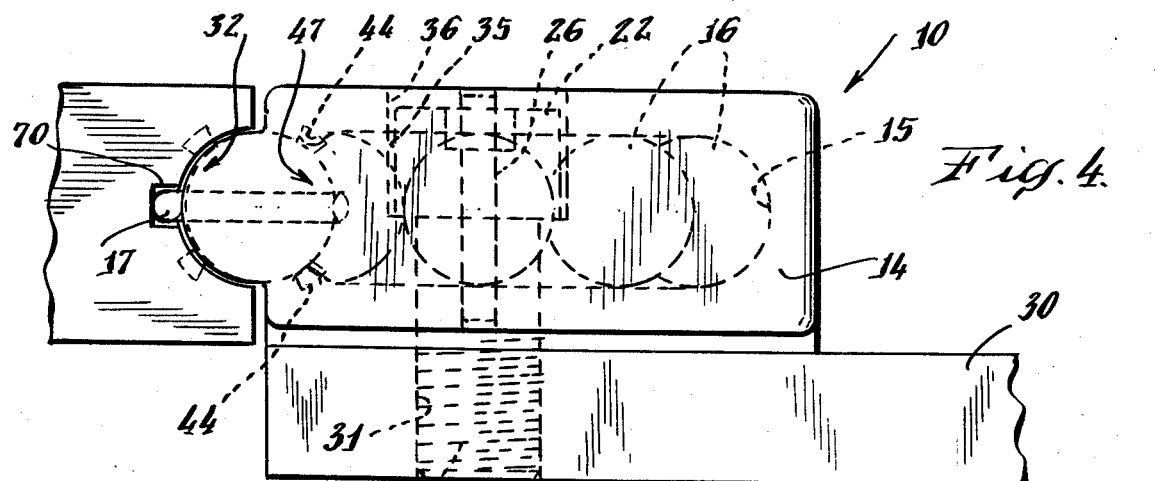
FIG. 4 is an end elevational side view drawn on the same scale as FIG. 3 and including dashed lines for illustrating internal components of the improved linear ball bearing. This linear ball bearing unit is shown mounted on a machine member in opposed relation to a cooperating way.
Figure 5:
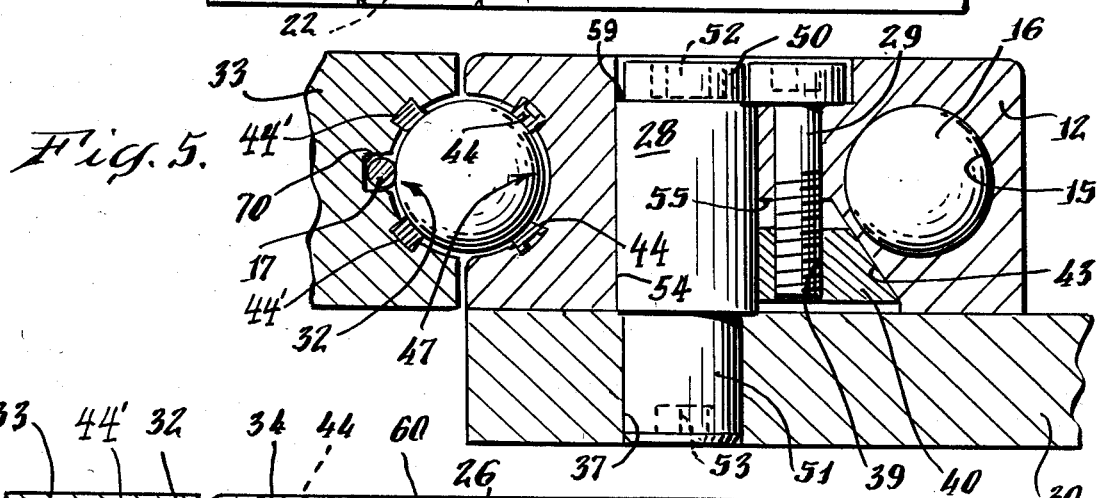
FIG. 5 is an elevational sectional view of the linear ball bearing unit mounted upon the machine member in opposed relationship to the cooperating way.
Figure 6:
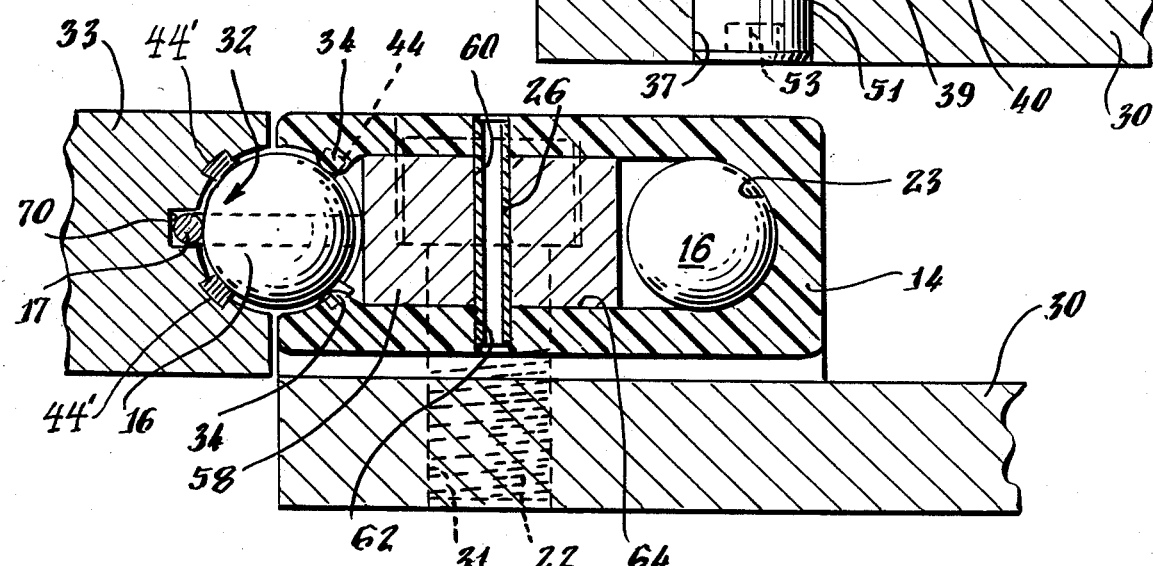
FIG. 6 is an elevational sectional view, similar to FIG. 5, but being a section taken through plane 6—6 of FIG. 3.

FIG. 1 shows an improved linear ball bearing 10 having two identical plastic end pieces 14 which fit over the ends of a unitary, central body 12 of inexpensive strong material. These three main components 14, 12, 14 form the housing assembly 11 which has within it a closed loop recirculation channel 15 (FIG. 3) for conducting hardened steel balls 16 around the inside of the housing assembly 11. The front face 20 extends along one of the sides of the housing assembly 11, and the body 12 has a longitudinal cutout 18 which is in communication with the channel 15 for enabling the balls 16 to come into contact with and to run along an opposed way 32, as shown in FIGS. 4, 5 and 6. The balls are loosely constrained along the cutout 18 by a retainer wire or bail 17 to retain the balls when the bearing unit is not positioned against the opposing way. This bail extends longitudinally along the entire length of the cutout 18 in the front face 20 and is located and held in place by grooved sockets 24. The housing assembly 11 is held together by a pair of spring-metal roll pins 26 which are inserted through registering holes in the plastic end pieces 14 and in the central body 12 so that the end pieces are fitted and held in place over the ends of the central body 12.

The perspective view of the housing assembly 11 shown in FIG. 1 shows a pair of socket head machine screws 22 for mounting the strong body 12 onto a machine member 30 as seen most clearly in FIG. 7. There is a pre-load adjustment eccentric post 28 located midway between the mounting screws 22. This pre-load adjustment is used to establish ahd set the amount of pre-loading compression which the balls will be subjected to when initially the housing assembly 12 is mounted with the balls in contact with an opposed way along which the balls will be rolling in use.

As mentioned earlier, the central body 12 of the housing assembly 11 is made of strong, inexpensive material, for example, cast iron or extruded aluminum cut to length. Thus, this main body component 12 can be finished to final shape by relatively few convenient machining operations. The end pieces 14 are injection-molded of strong rigid plastic material having lubricity characteristics, for example, such as Nylon or Delrin material. These plastic end pieces with their lubricity characteristics enable the recirculating balls 16 to move very quietly as compared with the prior art all-metal housings. Moreover, these two plastic end pieces 14 can be injection-molded from colored plastic material for providing an attractive and pleasing color contrast of both ends with the silver-grey aluminum or dark grey cast iron comprising the central body 12. If desired, various colorings of the plastic end pieces 14 can be used for color coding the various sizes of these compact, attractive, lowprofile linear ball bearing units 10.

FIG. 2 shows details of the structure of one of the end pieces 14 and shows the inside of an end portion 23 of the recirculation channel 15. The removable and replaceable race elements to be described later are held in place by retainer ears 34 formed in the end piece 14.

FIG. 3 depicts the eighteen balls 16 as they recirculate through the channel 15 and its end portions 23 in the assembled unit which is held together by the roll pins 26. This top view shows the two mounting machine screws 22 aligned along the longitudinal axis 27 of the linear ball bearing unit with the eccentric post 28 midway between them. Disposed to one side of the eccentric post 28 is an adjustment locking screw 29. This locking screw 29 serves to engage a wedge (FIG. 8) against the eccentric post 28 as shown in FIG. 5 for holding the pre-load setting while the mounting screws 22 are tightened for securing the linear ball bearing unit 10 onto a machine member 30 (FIGS. 4, 5, 6 and 7).

FIG. 4 shows the linear ball bearing 10 mounted atop a machine member 30 along-side a straight opposed way 32 on another member 33 of the machine. Each socket head mounting screw 22 is engaged within a threaded hole 31 in the base member 30. Each mounting socket screw 22 is received within a bored socket hole 36 in the body 12 of the housing assembly. It is to be noted that this bored hole 36 and its socket portion are slightly larger than the mounting screw for providing a clearance gap 35 around the shank and head for allowing the pre-load adjustment to be made by using the eccentric 28.

In order to mount the linear bearing unit 10 on the machine member 30 the pair of screws 22 are threaded into their respective threaded holes snuggly, but not fully tight. The eccentric post 28 is rotated to establish the desired pre-loading compression of the balls 16 against the opposed way 32. By virtue of the fact that this eccentric 28 is located in the center of the body 12 mid-way between the mounting screws 22 and is centered with respect to the front face cutout 18, it will put equal pre-loading force on the balls near opposite ends of the cutout 18, thereby bringing the bearing unit 10 into parallel alignment with the way 32. Then the locking screw 29 is tightened to hold the set position of the eccentric 28. Finally, the two mounting screws 22 are tightened securely in their threaded holes 31.

FIG. 5 shows the arrangement of the eccentric and wedge in detail. Eccentric post 28 is received within an unthreaded hole 37 in the machine member 30.

In FIG. 7 the two mounting screws 22 have their heads accessible from the top, and the upper socket 62 of the eccentric is accessible from the top. Thus, the bearing unit 10 can be pre-load adjusted and secured in place from above the machine member 30. Advantageously, this compact linear bearing unit 10 can also be pre-load adjusted and tightened in place from below a machine member in an installation where there is not sufficient access from the top. Threaded inserts are placed in the two counter-bored sockets where the heads of screws 22 are now shown. The holes 31 in the machine member 30 are not threaded; they are drilled and counter-bored from the bottom for providing sockets for the heads and shanks of the machine screw 22, with clearance for pre-load adjustment like the clearance 35. Consequently, the heads of the screws 22 are now accessible from below, and the lower socket 53 in the eccentric post is accessible from below, for pre-load adjustment from below the member 30 and for tightening in place from below. This is a versatile, compact linear ball bearing unit. Wedge member 40 abuts the lower portion of the head of the eccentric post 28 and has a threaded hole 39 adapted to receive the adjustment locking screw 29, for example, of the socket head type. The wedge member 40 is best seen in the perspective view of FIG. 8. An arcuate saddle surface 41 is adapted to fit against eccentric post 28 in order to hold the adjusted position of the eccentric. The wedge member 40 has a sloping convex cylindrical surface 42 which fits against an opposing sloped concave cylindrical surface 43 (FIG. 5) in the body 12. These sloping surfaces 42 and 43 are inclined at an angle of approximately 35° to the vertical. I have found that this angle is sufficiently small to provide a strong wedge holding action on the eccentric when the locking screw 29 is tightened, but this angle is sufficiently large to prevent the wedge from becoming jammed. In other words, the desired slope inclination is in the range from 25° to 38°, with 35° being optimum.

As seen in FIG. 8, the threaded hole 39 is a partial threaded hole, with a vertical slot 57 in the center of the concave surface 41 of the wedge member 40. The locking screw 29 is located close to the eccentric 28 so that its head overlaps a shoulder 59 machined on the upper end of the head of the eccentric post 28. This overlapping head of the screw 29 serves as a retainer for holding the eccentric in its socket 54.

Advantageously, the wedge 40 applies the locking force against the side of eccentric post 28 down low near the machine member 30. Thus, the wedge 40 tends to help in holding the eccentric post vertical against the counteraction from the pre-loading force on the balls, and thus it is not necessary that the hole 37 be bored with extraordinary precautions to avoid bell mouthing of this hole, because the wedge is helping the hole 37 in holding the eccentric post upright.

As illustrated best in FIGS. 5 and 7, the lowermost portion of the locking screw 29 does not extend entirely through the wedge member 40, and so it does not abut the top of machine member 30.

As shown in FIGS. 4, 5, 6 and 9, in this preferred embodiment of the invention, the balls 16 run in the front portion of the recirculation channel 15 along two race elements 44 which extend along the full length of the cutout 18 on the front side 20 of the body 12 of the housing assembly 11. Unlike the central body 12, which advantageously can be manufactured using an inexpensive material such as cast iron or aluminum, the races 44 are fabricated out of appropriate wear-resistant material such as hardened tool steel or alloy steel. The races 44 are held in position by race seats 45 which are longitudinal recesses in the central body 12 which extend parallel to longitudinal cutout 18. The innermost surfaces of these seats 45 are circular and are concentric with the desired axis of travel 46 (FIG. 9) of the balls 16 along the front 20 of the linear bearing unit 10. The two sides 48 of the race seats converge to define a keystone-shape space so that the race elements 44 cannot fall out. Race elements 44 project forward slightly from the back of the channel 47 so that the balls do not come into contact with the body 12. By virtue of the concentricity of the race seats 45 with the desired ball travel axis 46, neither longitudinal nor circumferential variations of moderate amount in the positions of the race elements 44 will compromise their precise accuracy as load-bearing components. The front surfaces of these elements 44 which touch the balls 16 can be ground to any reasonably desired geometrical configuration. One desirable configuration in my opinion for the front surfaces 49 of the race elements 44 is circularly cylindrical of slightly larger diameter than the diameter of the spherical balls 16 for causing these balls to roll along a line contact. If desired, the front surface 49 can be flat or convex for producing lower-friction line contact rolling. The rear surfaces of the race elements 44 have a central circumferentially longitudinal groove (as shown in FIG. 9) for providing a pair of spaced seating regions extending along both rear margins for seating against the concentric surface 45. Since these race elements are removable and replaceable, they do not fit unduly tight within their seats defined by surfaces 48-45-48, but as explained above neither moderate longitudinal shifting nor moderate circumferential shifting of these race elements 44 will cause any inaccuracy in the location of the axis of travel 46 by virtue of the advantageous geometric relationships which are provided in this compact linear housing unit 10.

The arrangement of the race elements 44, seats 48-45-48 and retainer ears 34 allows the user of the linear ball bearing 10 to replace worn race elements 44 or substitute different race elements as needed by simply pushing out one of the roll pins 26, removing an end piece 14 and sliding new elements 44 into place after the old ones have been removed.

As explained above, the forward convergence of the two sides 48 of the seat for the race element 44 keeps the race element from falling out of its seat. If desired, the two sides 48 may be parallel and the concentric seat 45 may be located deeper in the body 12. Then the race element is prevented from falling out by the balls 16 which in turn are prevented from falling out by the bail 17.

As shown in FIGS. 5 and 7, the eccentric post 28 has a top section 50 and a bottom section 51 which is seated and rotates in the hole 37. The post 28 is an integral piece which comprises two right circular cylinders of different diameters stacked end to end and axially offset.

The eccentric adjustment post 28 can be rotated about the longitudinal axis of its lower portion 51 by means of a socket wrench fit in either top socket 52 or bottom socket 53. The rotating eccentric top portion 50 of the post 28 effectively translates the housing assembly transversely relative to the machine member 30 and thereby adjusts the pre-load compression of the balls 16 against the way 32. Once the proper adjustment has been made, the housing assembly 10 is fixed in position relative to the machine member 30 by tightening lock screw 29. This screw tightens wedge member 40 in place for holding the desired position of the eccentric. Mounting screws 22 are then fully tightened to secure the housing assembly 11 into proper position.

In order to attach the end pieces 14 onto the central body 12, this body has a rounded projection 58 (FIG. 3) at each end which is flat on top and bottom as seen in FIGS. 6 and 7. The roll pin 26 fits snuggly through a vertical hole 60 in this projection 58 and fits snuggly in place in holes 62 in the top and bottom portions of the plastic end pieces 14. The thicknesses of the plastic above and below the projection 58 are equal, as shown in FIG. 2. Therefore, these two end pieces 14 are identical in shape for reducing manufacturing costs. They are interchangeable end for end, except that one of them is turned upside down relative to the other. The socket 64 (FIG. 2) in the end piece 14 fits snuggly over the projection 58 (FIGS. 6 and 7), and the roll pin 26 is inserted to complete assembly.

The balls 16 recirculate very quietly and smoothly in the compact unit 10. The plastic end pieces 14, with their lubricity character cause the balls to travel quietly in the end channels 23. The balls make a smooth transition as they roll around the curve at each end of the bail 17. The very ends of the bail slope down gradually into their sockets 24, almost tangentially, below the adjacent surface 72 of the plastic. The balls do not bump against the end of the bail; they smoothly transfer their rolling contact from the plastic at 72 to the nearby curving portion of the bail. There is no gap to jump.

Also, it is to be noted in FIG. 3 that the balls do not curve around a half circle at each end of the bearing assembly 10. There is a short straight portion 74 of the end channel 23 with curves of 90° at each end of the short straight path portion 74. There is clearance between the balls and the surface 68 of the metal projections 58.

The machine member 30 on which the linear bearing unit 10 is mounted may be the movable member, or the other member 33 which defines the straight way 32 may be the movable member, i.e., either one may move back and forth with respect to the other, depending upon the particular machine or instrument or other equipment in which this compact, flat profile bearing unit 10 is installed. The way 32 includes a longitudinal groove 70 for providing clearance for the ball-retaining bail 17. The way 32 is straight and may be fabricated in any suitable manner for the balls 16 to roll along it. If desired, the way 32 may include removable race elements 44' which are similar in structure and are seated similar to the geometric relationships shown in FIG. 9 for the race elements 44, except that the race elements 44' for the way 32 are longer.

The invention also provides for a repair kit consisting of new race elements 44 which can be used to restore linear ball bearing units 10 whose races have been worn by use or which require races having different ball contact surface configurations. The front rolling contact surface of the interchangeable, removable race elements 44 can be conveniently ground with concave shapes for wide line-contact rolling engagement, or can be ground flat or convex for lower friction rolling engagement, as the particular situation or application requires.

While the invention has been particularly shown and described with reference to a preferred embodiment, it will be understood by those skilled in the art that various changes in form and details may be made without departing from the spirit and scope of the invention as defined by the appended claims and reasonable equivalents of the claimed elements.

What is claimed is:

1. A linear ball bearing adapted to be mounted opposite a way member for allowing the way member and bearing to travel freely back and forth relative to each other comprising:
    a housing defining an endless path along which a plurality of balls can move,
    one portion of said endless path being straight,
    said housing including a front channel extending along said straight portion of the endless path,
    said housing including at least one straight wear-resistant, ball bearing race element seated in said front channel for enabling the balls to roll along said race element as they move along said front channel, means for removably holding said wear-resistant, ball-bearing race element for enabling said element to be removed and replaced, said housing including a seating groove for said race element extending longitudinally along said front channel, said seating groove having a cylindrical bottom surface concentric with and extending parallel with the desired axis of travel of the centers of said balls as they roll along said race element, and said race element seating against said cylindrical bottom surface, whereby moderate circumferential shifting or moderate longitudinal shifting of said removable race element within its seating groove will not diminish the accuracy of rolling of the balls along said desired axis of travel.

2. A linear ball bearing as claimed in claim 1, in which:

said removable, wear-resistant, ball-bearing race element has a central groove extending along its bottom for defining a pair of spaced parallel seating surfaces positioned along the opposite longitudinal marginal bottom portions of said race element for seating against said cylindrical bottom surface of said seating groove.

3. A linear ball bearing as claimed in claim 1, in which:

said means for removably holding said race element includes a pair of removable plastic end pieces of said housing, said housing comprises a central body having said plastic end pieces removably fastened to opposite ends of said central body, said plastic end pieces define the respective curved end channels of said endless path, and said plastic end pieces prevent removal of said race element until at least one of said end pieces has been removed from said central body.

4. A linear ball bearing as claimed in claim 1, in which:

said central body is formed of metal, said plastic end pieces are formed of rigid plastic having lubricity characteristics, and the respective curved end channels define a short straight portion of the path with curves of 90° at each end of the short straight path portion.

5. A linear ball bearing as claimed in claim 1, in which:

said means for removably holding said race element include the balls which are located in said front channel, and a removable bail which extends along the length of said front channel in front of the balls which are located in said front channel.

6. The linear ball bearing adapted to cooperate with a way member to permit free relative longitudinal movement between said member and said linear ball bearing, said linear ball bearing comprising:

a housing for holding a plurality of movable balls, said housing defining a front surface adapted to face toward said way member, said housing defining a closed loop path therein for providing an endless path for recirculation of said plurality of movable balls within said housing, a straight front channel portion of said path being positioned near the front surface of said housing and the balls being accessible from outside of the housing along said straight front channel of the recirculation path for allowing said way member to be in contact with the balls as they travel along said straight front channel, said straight front channel being adapted to receive therein at least one removable, wear-resistant, hard, straight, ball-bearing race element for defining a rolling surface along which said plurality of balls can roll as they travel along said straight channel, means for removably holding said race element in said front channel, an eccentric post positioned centrally in said housing perpendicular to the plane of travel of said plurality of balls in said recirculation path within the housing, said eccentric post being rotatable about its axis for adjusting the pre-loading forces applied to said balls as they travel along said straight front channel in contact with said way member, and a wedge member in said housing positioned in abutting relationship with respect to said eccentric post, and screw means for tightening said wedge member against said eccentric post for locking said eccentric in its adjusted position.

7. The linear ball bearing as claimed in claim 6, in which:

said wedge member is positioned at least partially on the opposite side of said eccentric post from said straight front channel for exerting a component of force in the forward direction on said post as said wedge is tightened for opposing the rearward reaction force on said post tending to tilt said post rearwardly due to the pre-loading of the balls against said way member.

8. The linear ball bearing as claimed in claim 6, wherein:

one side end of said wedge member is concave saddle-shaped adapted to receive thereagainst a section of said eccentric post.

9. The linear ball bearing as claimed in claim 8, wherein:

the other side of said wedge member is convex cylindrical and is sloped.

10. The linear ball bearing as claimed in claim 9, wherein:

said other side of said wedge is sloped at an inclination in a range between 25° and 38° relative to the vertical.

11. The linear ball bearing as claimed in claim 6, wherein:

said wedge member defines a vertically oriented threaded hole for receiving a locking screw for tightening the wedge member, and the head of said locking screw overlaps a shoulder on said eccentric post for retaining said eccentric post in said housing.

12. An improved linear ball bearing as claimed in claim 7, in which said sloped surface is disposed approximately between 25° and 38° off the vertical.

13. An improved linear ball bearing adapted for rolling engagement with a way member for relative movement between said way member and linear bearing in a direction parallel to the longitudinal axis of the linear ball bearing comprising:

a housing assembly having a central body which is made from a first material and having two identical end pieces removably connected to the central body which are made from a second material;

said housing assembly defining an endless recirculation channel within it and having a longitudinal cutout along its front side;

a plurality of balls capable of bearing a load which circulate within said endless channel and which come into rolling contact with the way member through said cutout along the front side of said housing;

a replaceable, wear-resistant, race element having a contact surface on which said balls run;

said race element further having a seating surface which is concentric with the desired axis of travel of the centers of said balls as they run through said channel, said central body having at least one recessed race seat concentric with the desired axis of travel of the centers of the balls in the channel situated in the longitudinal cutout and running the entire length of said central body for removably receiving and holding said race element in said seat;

whereby said removable race element may shift slightly longitudinally or circumferentially without compromising its accuracy as a load-bearing component for keeping said balls rolling along said desired axis; and said removable end pieces prevent said race element from being removed from said race seat when they are connected to said central body.

14. The improved linear ball bearing as claimed in claim 13, in which:
said end pieces and said central body are assembled by fitting each end piece over a respective projecting end portion of said central body, and said end pieces are held in place by a roll pin passing through the end piece from top to bottom and through said projecting end portion of the central body.

15. The improved linear ball bearing as claimed in claim 14, in which said first material is cast iron.

16. The improved linear ball bearing as claimed in claim 14, in which said first material is extruded aluminum.

17. The improved linear ball bearing as claimed in claim 13, in which said second material is strong rigid plastic material.

18. The improved linear ball bearing as claimed in claim 13, in which said race element is made of hardened steel.

19. The improved linear ball bearing as claimed in claim 17, in which said plastic end pieces each have a bail socket capable of receiving and holding the end of a retaining bail and a bail held in said sockets which retains said bails in the unmounted bearing as they circulate in said endless channel on the side of said housing assembly where said cutout is located, and the respective ends of said bail slope down gradually in their sockets beneath the adjacent surface of the plastic for producing a smooth rolling transition from the plastic surface to the bail.

20. An improved linear ball bearing as claimed in claim 13, in which:
said central body has a pair of mounting holes which extend through said central body and are perpendicular to the plane of said balls' endless circulation path;
said central body also has an eccentric adjustment post hole extending through it midway between and parallel to said mounting holes for receiving an eccentric adjustment post;
said eccentric adjustment post has a cylindrical top section and a cylindrical bottom section which has a smaller diameter than said top section and said post is integral with said two cylindrical sections stacked end-to-end with the axis of the top section offset from the axis of the bottom section;
said central body has a locking screw hole extending through it parallel to and spaced from said eccentric post hole;
a wedge having an arcuate surface for engaging the top section of said post in an upright position;
a sloped surface in said central body generally opposite said arcuate surface disposed to receive said wedge; and
a locking screw passing through said screw hole and being threaded into said wedge for locking said wedge against said eccentric post.

* * * * *